United States Patent [19]

Dean

[11] Patent Number: 4,588,774

[45] Date of Patent: May 13, 1986

[54] THERMODYNAMICALLY MISCIBLE POLYMER COMPOSITIONS

[75] Inventor: Barry D. Dean, Broomall, Pa.

[73] Assignee: Atlantic Richfield Company, Los Angeles, Calif.

[21] Appl. No.: 708,773

[22] Filed: Mar. 6, 1985

[51] Int. Cl.⁴ .............. C08L 55/02; C08L 35/06; C08L 33/12; C08L 39/04
[52] U.S. Cl. ............................ 525/73; 525/205
[58] Field of Search ...................... 525/205, 73

[56] References Cited

U.S. PATENT DOCUMENTS

| 3,676,404 | 7/1972 | Nield | 525/205 |
| 3,766,142 | 10/1973 | Nield et al. | 525/73 |
| 4,374,951 | 2/1983 | Lee et al. | 525/205 |
| 4,381,373 | 4/1983 | Ikuma | 525/194 |
| 4,504,627 | 3/1985 | Dean | 525/205 |

Primary Examiner—Carman J. Seccuro
Attorney, Agent, or Firm—Dennis M. Kozak

[57] ABSTRACT

A thermodynamically miscible polymer composition comprised of a terpolymer having recurring units of methylmethacrylate, N-aryl substituted maleimide, and vinyl aromatic monomer and an acrylonitrile copolymer is disclosed.

16 Claims, No Drawings

THERMODYNAMICALLY MISCIBLE POLYMER COMPOSITIONS

This invention relates to polymer compositions.

In one of its more specific aspects this invention pertains to thermodynamically miscible polymer compositions of a terpolymer of methylmethacrylate, N-aryl substituted maleimide and a vinyl aromatic monomer with an acrylonitrile copolymer.

Terpolymers of methyl methacrylate, α-methyl styrene and a substituted maleimide are described in U.S. Pat. No. 3,676,404. Blends of acrylonitrile/butadiene/styrene polymers (ABS) with maleimide-containing vinyl aromatic co- and terpolymers are described in U.S. Pat. Nos. 3,642,949; 3,652,726; 4,374,951 and 4,404,322. U.S. Pat. No. 4,381,373 teaches a blend of ABS and a terpolymer comprising 15 to 50 weight % of an N-substituted aryl maleimide, 85 to 40 weight % of a vinyl aromatic monomer and 0 to 30 weight % of a vinyl comonomer, which can be methylmethacrylate. U.S. Pat. No. 4,381,373 does not describe a polymer alloy in which the N-phenylmaleimide terpolymer is thermodynamically miscible with the ABS resin.

The miscibility of polymers is generally determined using differential scanning calorimetry to measure glass transition temperature. A thermodynamically miscible polymer composition will exhibit a single glass transition temperature value which typically lies intermediate between the glass transition temperatures of the individual polymeric components. Correspondingly, a partially miscible or immiscible composition will exhibit two or more glass transition temperature values. Accordingly, two or more polymers are said to be thermodynamically miscible when the free energy of mixing is negative. And, thermodynamic miscibility is said to exist when a mixture of two or more polymers results in a material exhibiting a single, well defined glass transition temperature.

Quite surprisingly, it has now been found that within certain proportions a terpolymer of methylmethacrylate, N-aryl substituted maleimide and a vinyl aromatic monomer is thermodynamically miscible with a styrene/acrylonitrile resin.

According to this invention there is provided a polymer composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a polymer selected from the group consisting of (1) a copolymer matrix of from about 65 to about 85% by weight of a vinyl aromatic monomer selected from the group consisting of styrene and α-methyl styrene and from about 15 to about 35% by weight acrylonitrile, and (2) a rubber grafted with a copolymer matrix of from about 65 to about 85% by weight of a vinyl aromatic monomer selected from the group consisting of styrene and α-methylstyrene, and from about 15 to about 35% by weight acrylonitrile wherein the weight ratio of component (A) to the copolymer matrix of component (B) is from 99:1 to 1:99, and wherein component (A) and the copolymer matrix of (B) are thermodynamically miscible with one another such that the polymer composition exhibits a single glass transition temperature value.

According to this invention, there is also provided a method of producing a molded composition which comprises forming a composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a polymer selected from the group consisting of (1) a copolymer matrix of from about 65 to about 85% by weight of a vinyl aromatic monomer selected from the group consisting of styrene and α-methyl styrene and from about 15 to about 35% by weight acrylonitrile, and (2) a rubber grafted with a cpolymer matrix of from about 65 to about 85% by weight of a vinyl aromatic monomer selected from the group consisting of styrene and α-methylstyrene, and from about 15 to about 35% by weight acrylonitrile and wherein the weight ratio of component (A) to the copolymer matrix of component (B) is from 99:1; and wherein component (A) and the copolymer matrix of (B) are thermodynamically miscible with one another such that the polymer composition exhibits a single glass transition temperature value, and molding the resulting composition.

Also, according to this invention there is provided a molded composition comprising a single continuous phase, the single continuous phase being a polymer composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a copolymer matrix of from about 65 to about 85% by weight of a vinyl aromatic monomer selected from the group consisting of styrene and α-methyl styrene and from about 15 to about 35% by weight acrylonitrile.

According to this invention there is also provided a molded composition comprising a continuous phase and a disperse phase within the continuous phase, the continuous phase being a polymer composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a rubber grafted with a copolymer matrix of from about 65 to about 85% by weight of a vinyl aromatic monomer selected from the group consisting of styrene and α-methylstyrene, and from about 15 to about 35% by weight acrylonitrile and the disperse phase being the rubber which is grafted with a copolymer matrix.

The N-aryl substituted maleimide of component (A) can be N-phenylmaleimide, N-tolylmaleimide, N-(chlorophenyl)maleimide, N-(bromophenyl)maleimide and the like, and their mixtures. The preferred N-aryl substituted maleimide is N-phenylmaleimide.

The vinyl aromatic monomer of component (A) can be styrene, p-methylstyrene, t-butylstyrene or α-methylstyrene and the like and their mixtures. The most preferred vinyl aromatic monomer is α-methylstyrene.

The preferred terpolymer composition is from about 60 to about 70% by weight methylmethacrylate, from about 20 to about 25% by weight N-aryl substituted maleimide and from about 10 to about 15% by weight of the vinyl aromatic monomer.

The number average molecular weight (Mn) of the component (A) terpolymer as measured by gel permeation chromatography (vs a monodisperse polystyrene standard) should be within the range of from 50,000 to about 150,000. The most preferred Mn range is from about 70,000 to about 100,000.

Examples of suitable component (B) materials include ABS (acrylonitrile-poly(butadiene)-styrene terpolymer), AES (acrylonitrile-EPDM-styrene terpolymer), SAN (styreneacrylonitrile copolymer) and the like and their mixtures. The preparation of the rubber grafted (ABS or AES) polymers is well known and will be incorporated in this invention by reference to U.S. Pat. Nos. 3,509,237; 3,509,238; 3,851,014; 3,903,200; 4,471,092 and 4,476,283. The preferred composition of component (B) is a rubber, either polybutadiene or EPDM, grafted with a copolymer having from 72 to 80% by weight of a vinyl aromatic monomer and 20 to 28% by weight of acrylonitrile. The vinyl aromatic monomer in component (B) can be either styrene or α-methylstyrene, however, most preferred is styrene.

The polymer composition of this invention will comprise from about 99 to about 1% by weight of component (A) and from about 1 to about 99% by weight of the copolymer matrix of component (B) excluding the weight of the rubber, if present. Preferrably the polymer composition will comprise from 1 to 25 weight % of component (A) and from 99 to 75 weight % of the polymer matrix of component (B). If the rubber grafted with a copolymer matrix is selected as component (B), the amount of rubber utilized will be from about 1 to about 40 parts by weight per 100 parts of the copolymer matrix of (B), that is the vinyl aromatic plus the acrylonitrile.

Evaluation of material properties was performed based on the following ASTM standard tests: flexural modulus (D-790), tensile strength (D-638), elongation (D-638), notched Izod (D-256) and DTUL (deflection temperature under load), ⅛" at 264 psi, (D-648). Gardner falling weight index was established using a 1¼" diameter orifice and an 8 pound ½" diameter weight. Glass transition temperature was determined by differential scanning calorimetry.

EXAMPLE 1

This example serves to demonstrate the preparation of a methylmethacrylate/N-phenylmaleimide/α-methylstyrene (MMA/N-PMI/α-MeS) terpolymer.

A 3-pint Chemco reactor was charged with 500 grams of water. A stream of nitrogen gas was bubbled through the water while being heated to 60° C. for thirty minutes. Next, 4.2 grams of Vinol ® 540 poly-(vinyl alcohol) available from Air Products Co., were added to the reactor. The aqueous system was vigorously stirred under a blanket of nitrogen until all of the poly(vinyl alcohol) had dissolved. Once dissolved, 0.046 gram of sodium bisulfite was added. Then a monomer-free radical initiator solution was added, the composition of which is as follows: methyl methacrylate (137.5 grams), α-methylstyrene (37.5 grams), N-phenylmaleimide (75 grams), benzoyl peroxide (0.74 grams) and t-butylperoctoate (0.11 grams). The contents of the reactor were heated to 90° C.; and this temperature was held for 1.5 hours. The temperature was raised to 131° C. and held for 4 hours. The pale yellow beads which formed were recovered by filtration and washed with methanol. The weight of the beads recovered was 249 grams. The beads were dissolved in tetrahydrofuran and the terpolymer was recovered by precipitation of the THF solution into methanol. The white powder recovered was dried to a constant weight of 241 grams (96.4% conversion).

The terpolymer was evaluated for composition, glass transition temperature and molecular weight (Table I).

TABLE I

| | |
|---|---|
| % nitrogen | 1.95 |
| % N—phenylmaleimide | 24.1 |
| % α-methylstyrene[1] | 14.8 |
| % methylmethacrylate | 61.1 |
| Tg(°C.)[2] | 181 |
| $M_n$[3] | 93,400 |

[1]Carbon 13 NMR Spectroscopy
[2]Differential Scanning Calorimetry
[3]Gel Permeation Chromatography

EXAMPLE 2

This example serves to demonstrate the thermodynamic miscibility of the MMA/α-MeS/N-PMI terpolymer of Example 1 with a styrene/acrylonitrile (SAN) copolymer matrix. Four compositions of MMA/α-MeS/N-PMI with SAN copolymers were prepared in a Brabender plasticord mixer at 200° C. with a rotor speed of 63 rpm. The compositions and controls were evaluated by differential scanning calorimetry (DSC, Table II).

TABLE II

| | Composition (wt. %) | | | | | |
|---|---|---|---|---|---|---|
| SAN[1] | 100 | — | 50 | — | 75 | — |
| SAN[2] | — | 100 | — | 50 | — | 75 |
| NMA/α-MeS/N—PMI (Example 1) | — | — | 50 | 50 | 25 | 25 |
| Tg(°C., DSC) | 109 | 109 | 139.5 | 141 | 125.5 | 126.5 |

[1]Lustran ® -SAN-31, Monsanto Chemical Co. (23.4% acrylonitrile)
[2]Lustran ® -SAN-33, Monsanto Chemical Co. (32.2% acrylonitrile)

EXAMPLE 3

This example serves to demonstrate the useful physical properties, particularly heat distortion temperature, obtained from a polymer composition of this invention containing 500 grams of Lustran ® SAN-31 resin, and 500 grams of the MMA/α-MeS/N-PMI terpolymer prepared according to the procedure of Example 1. The two polymers were combined and stabilized with 20 g Ultranox ™ 256 antioxidant, a polymeric phenol available from Borg-Warner Chemical Co. The composition was extruded into pellets and test specimens were molded to evaluate physical properties (Table III).

TABLE III

| | | |
|---|---|---|
| Lustran SAN-31 | 100% | 50% |
| MMA/α-MeS/N—PMI | — | 50% |
| Tg(°C., DSC) | 109 | 139.5 |
| Tensile Str (psi) | 9,500 | 10,500 |
| Flex. Str (psi) | 16,500 | 16,300 |
| Flex. Mod (psi) | 510,000 | 530,000 |
| DTUL (⅛", F) | 183 | 242 |
| Elongation (%) | 2.2 | 3.2 |
| Notched Izod (ft-lbs/in) | 0.7 | 0.8 |

EXAMPLE 4

This example serves to demonstrate the useful physical properties, particularly heat distortion temperature, obtained from a polymer composition of this invention containing 834 grams of ABS resin and 166 grams of MMA/α-MeS/N-PMI terpolymer (Example 1). The two polymers were combined and stabilized with 20 grams of Ultranox ™ 256 antioxidant. The composition was extruded into pellets and test specimens were molded to evaluate physical properties (Table IV).

TABLE IV

| | | |
|---|---|---|
| ABS[1] | 100% | 83.4% |
| MMA/α-MeS/N—PMI | — | 16.6% |
| Tg(°C., DSC) | 107 | 119.5 |
| Tensile Str (psi) | 6,250 | 6,820 |
| Flex Mod (psi) | 342,100 | 367,100 |
| DTUL (⅛", F) | 173 | 200 |
| Vicat (°C.) | 106.5 | 117.5 |
| Notched Izod (ft-lbs/in) | 6.8 | 3.3 |
| GFWI (in-lbs)[2] | 420 | 182 |
| Elongation (*%) | 59 | 27 |

[1]31.6 parts by weight polybutadiene per 100 parts SAN copolymer matrix (22.4% AN)
[2]ASTM D-1525

EXAMPLE 5

This example serves to demonstrate the useful physical properties, particularly heat distortion temperature, obtained from a polymer composition of this invention prepared from 834 grams of Rovel ® 701 resin obtained (Uniroyal Co.) and 166 grams of MMA/α-MeS/N-PMI terpolymer (Example 1). The two polymers were combined and stabilized with 20 grams of Ultranox ™ 256 antioxidant. The composition was extruded into pellets and test specimens were molded to evaluate physical properties (Table V).

TABLE V

| | | |
|---|---|---|
| Rovel ® 701 Resin[1] | 100% | 83.4% |
| MMA/α-MeS/N—PMI | — | 16.6% |
| Tg(°C., DSC) | 106 | 120 |
| Tensile Str (psi) | 6,200 | 7,350 |
| Flex Mod (psi) | 290,000 | 320,000 |
| DTUL (⅛", F) | 168 | 207 |
| Notched Izod (ft-lbs/in) | 12.8 | 7.4 |
| GFWI (in-lbs) | 360 | 230 |

[1]SAN-g-EPDM, 25 parts by weight EPDM per 100 parts SAN, (26 wt. % AN)

It will be evident from the foregoing that various modifications can be made to this invention. Such, however, are considered as being within the scope of the invention.

What is claimed is:

1. A polymer composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a polymer selected from the group consisting of (1) a copolymer matrix of from about 65 to about 85% by weight of a vinyl aromatic monomer selected from the group consisting of styrene and α-methyl styrene and from about 15 to about 35% by weight acrylonitrile, and (2) a rubber grafted with a copolymer matrix of from about 65 to about 85% by weight of a vinyl aromatic monomer selected from the group consisting of styrene and α-methylstyrene, and from about 15 to about 35% by weight acrylonitrile, said rubber being employed in an amount within the range of from about 1 to about 40 parts per each 100 parts by weight of said vinyl aromatic monomer plus said acrylonitrile, wherein the weight ratio of component (A) to the copolymer matrix of component (B) is from 99:1 to 1:99; and wherein component (A) and the copolymer matrix of (B) are thermodynamically miscible with one another such that the polymer composition exhibits a single glass transition temperature value.

2. The polymer composition of claim 1 in which in component (A) said N-aryl substituted maleimide is selected from the group consisting of at least one of N-phenylmaleimide, N-tolymaleimide, N-(chlorophenyl)maleimide and N-(bromophenyl)maleimide.

3. The polymer composition of claim 1 in which in component (A) said vinyl aromatic monomer is selected from the group consisting of at least one of styrene, p-methylstyrene, t-butylstyrene and α-methylstyrene.

4. The polymer composition of claim 1 in which component (A) is a terpolymer of recurring units of methylmethacrylate, N-phenylmaleimide and α-methylstyrene.

5. The polymer composition of claim 1 in which the component (A) terpolymer has a number average molecular weight within the range of from about 50,000 to about 150,000.

6. The polymer composition of claim 1 in which the component (A) terpolymer has a number average molecular weight within the range of from about 70,000 to about 100,000.

7. The polymer composition of claim 1 in which said component (B) is a graft copolymer of styrene and acrylonitrile onto polybutadiene.

8. The polymer composition of claim 1 in which said component (B) is a graft copolymer of styrene and acrylonitrile onto EPDM.

9. The polymer composition of claim 1 in which said component (B) is a styrene-acrylonitrile copolymer.

10. The polymer composition of claim 1 in which said component (B) is a graft copolymer of α-methyl styrene and acrylonitrile onto polybutadiene.

11. The polymer composition of claim 1 in which said component (B) is graft copolymer of α-methylstyrene and acrylonitrile onto EPDM.

12. The polymer composition of claim 1 in which said component (B) is a α-methylstyrene-acrylonitrile copolymer.

13. The polymer composition of claim 1 in which the weight ratio of component (A) to the copolymer matrix of component (B) is from 25:75 to 1:99.

14. A method of producing a molded composition which comprises forming a composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a polymer selected from the group consisting of (1) a copolymer matrix of from about 65 to about 85% by weight of a vinyl aromatic monomer selected from the group consisting of styrene and α-methyl styrene and from about 15 to about 35% by weight acrylonitrile and (2) a rubber grafted with a copolymer matrix of from about 65 to about 85% by weight of a vinyl aromatic monomer selected from the group consisting of styrene and α-methylstyrene, and from about 15 to about 35% by weight acrylonitrile, said rubber being employed in an amount within the range of from about 1 to about 40 parts per each 100 parts by weight of said vinyl aromatic monomer plus said acrylonitrile, and wherein the weight ratio of component (A) to the copolymer matrix of component (B) is from 99:1 to 1:99; and wherein component (A) and the copolymer matrix of (B) are thermodynamically miscible with one another such that the polymer composition exhibits a single glass transition temperature value, and molding the resulting composition.

15. A molded composition comprising a single continuous phase, the single continuous phase being a polymer composition comprising (A) a terpolymer having from about 50 to about 90% by weight of a methylmethacrylate, from about 9 to about 35% by weight of an N-aryl substituted maleimide and from about 1 to about 15% by weight of a vinyl aromatic monomer and (B) a copolymer matrix of from about 65 to about 85% by weight of a vinyl aromatic monomer selected from the group consisting of styrene and α-methyl styrene and from about 15 to about 35% by weight of acrylonitrile.

16. A molded composition according to claim 1 wherein b is the rubber grafted copolymer matrix, said composition comprising a copolymer matrix continuous phase and a rubber disperse phase.

* * * * *